(No Model.)
J. C. VETTER.
TABLE HINGE.
No. 281,322. Patented July 17, 1883.
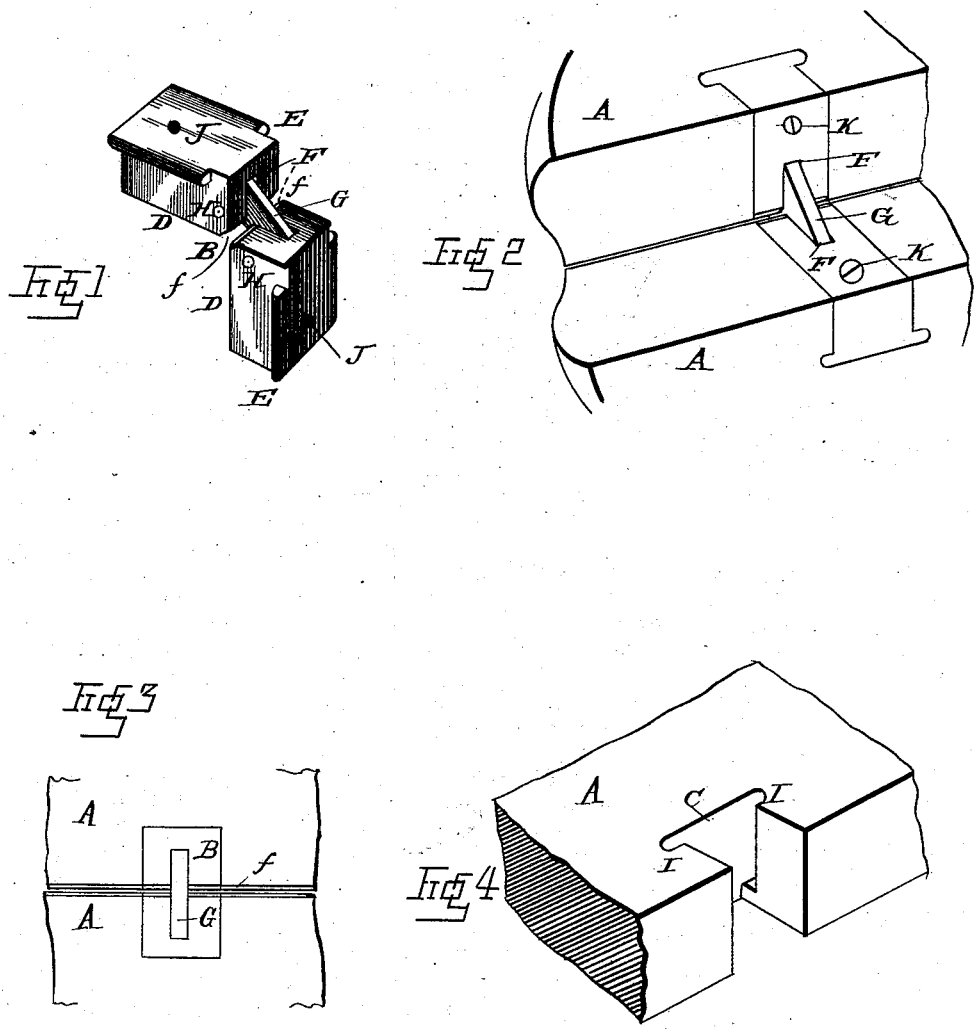
WITNESSES:
Fred. G. Dieterich
Jno. G. Hinkel
John C. Vetter,
INVENTOR.
by Louis Bagger & Co.
ATTORNEYS

UNITED STATES PATENT OFFICE.

JOHN C. VETTER, OF INDIANAPOLIS, INDIANA.

TABLE-HINGE.

SPECIFICATION forming part of Letters Patent No. 281,322, dated July 17, 1883.

Application filed January 20, 1883. (No model.)

*To all whom it may concern:*

Be it known that I, JOHN C. VETTER, of Indianapolis, in the county of Marion and State of Indiana, have invented certain new and useful Improvements in Hinges; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hinge detached. Fig. 2 is a similar view of the same inserted into two leaves of a table or other object. Fig. 3 is a plan view, showing the ends of the hinge-leaves and connecting-arm; and Fig. 4 is a perspective view of the recess adapted to receive one of the hinge-leaves.

Similar letters of reference indicate corresponding parts in all the figures.

My invention has relation to hinges; and it consists in the improved construction of parts of a hinge adapted to be inserted into the two parts to be hinged together, so as to be flush with their surfaces at all points, as hereinafter more fully shown and described, and particularly pointed out in the claim.

In the accompanying drawings, the letters A A indicate the two leaves of a table or other article, hinged together by the hinges B, the leaves of which are inserted in recesses C in the ends of the leaves A. These hinges consist of two rectangular prismatic leaves, D D, having two laterally-extending flanges, E, upon the edges of their outer sides, reaching from their free ends to near their hinged ends. The inner beveled corners, *f*, of the leaves are recessed at F to receive the ends of an arm, G, which is hinged in these recesses upon pintles H, inserted through the sides of the recesses and through eyes at its ends. The leaves are inserted into the recesses C, which are shaped corresponding to the leaves, having extensions I, corresponding to the flanges E, so that the hinge, when inserted into the recesses, will be held in place by the flanges, and the said flanges and the extensions I of the recesses, only extending part of the length of the hinge and the recesses, stopping a short distance from the hinge end of the same, will prevent the leaves of the hinge from being drawn out of the recesses at the hinge end when the table-leaf is swung down. For the purpose of further securing the hinge in the recesses the leaves have screw-holes J from their inner sides, in which screws K are inserted, passing into the inner sides of the recesses.

It will be seen that this hinge, which may be used any place where a hinge is required, is exceedingly strong and simple in construction, and that it will stay in its place by its peculiar shape and the shape of its recess, thus exercising very little strain upon the fastening-screws.

I am aware that hinges have been made having laterally-projecting beveled flanges upon their leaves adapted to be inserted into correspondingly-shaped recesses in the leaves to be hinged together, and that likewise hinges have been made in which the ends of the leaves are connected by means of an arm hinged at both ends in recesses in the meeting ends of the leaves, and I do not claim such construction, broadly; but

What I claim, and desire to secure by Letters Patent of the United States, is—

In combination with the table-leaves A, having recesses C, provided with laterally-projecting extensions or grooves I, extending from the inner side of the recess for a part of the length of the same, of the herein-described hinges B, consisting of the prismatic leaves D, having flanges E extending laterally for a part of the length of the leaves, and recesses F at their inner beveled corners, and the arm G, hinged in the said recesses at both ends, as and for the purpose shown and set forth.

In testimony that I claim the foregoing as my own I have hereunto affixed my signature in presence of two witnesses.

JOHN C. VETTER.

Witnesses:
O. S. HADLEY,
ALEXANDER STOOPS.